(No Model.)
C. L. & F. G. LEE.
APPARATUS FOR SEPARATING CREAM FROM MILK.
No. 605,252. Patented June 7, 1898.
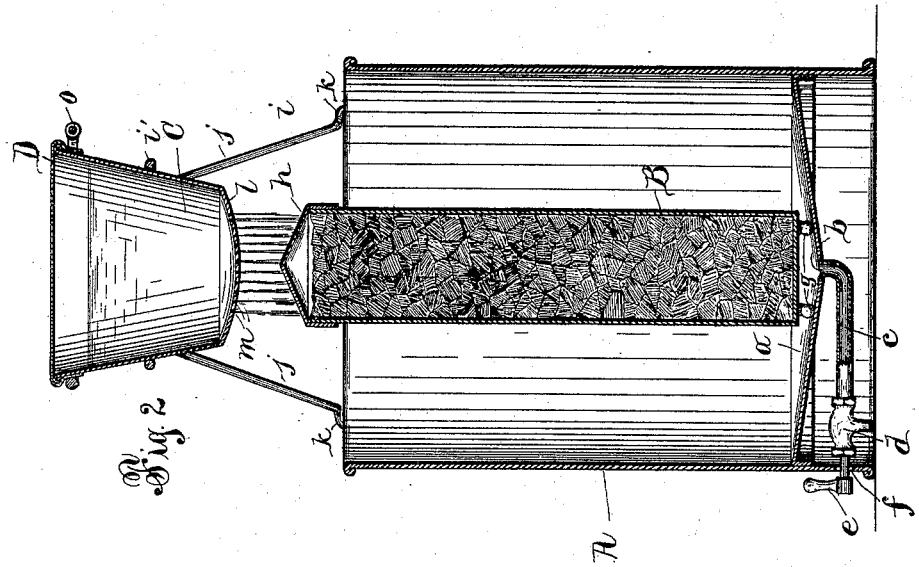
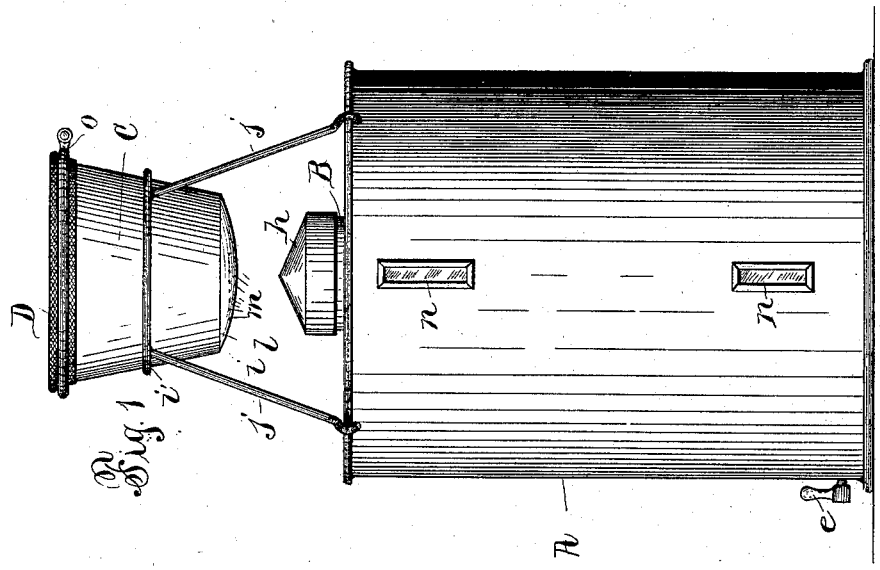
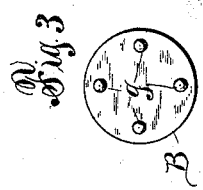
WITNESSES:
INVENTORS:
Chester L. Lee
and Frederick G. Lee
By E. Laass
their ATTORNEY

UNITED STATES PATENT OFFICE.

CHESTER L. LEE, OF ELLISBURG, AND FREDERICK G. LEE, OF PIERREPONT MANOR, NEW YORK.

APPARATUS FOR SEPARATING CREAM FROM MILK.

SPECIFICATION forming part of Letters Patent No. 605,252, dated June 7, 1898.

Application filed September 13, 1897. Serial No. 651,446. (No model.)

*To all whom it may concern:*

Be it known that we, CHESTER L. LEE, of Ellisburg, and FREDERICK G. LEE, of Pierrepont Manor, in the county of Jefferson, in the State of New York, have invented new and useful Improvements in Processes of and Apparatus for Separating Cream from Milk, of which the following, taken in connection with the accompanying drawings, is a full, clear, and exact description.

Our invention relates to an improvement in apparatus for separating cream from milk; and it has special reference to that class of apparatus comprising a can into which the milk is deposited and allowed to remain a sufficient period of time to allow the cream to rise, which can is provided with an outlet in the bottom thereof, whereby the milk is withdrawn, leaving the cream in the can, from which it is subsequently withdrawn.

The object of our present invention is to provide an apparatus by which the above process is effected with better results and to produce an apparatus which will be simple in construction and at the same time very efficient for the purpose above stated.

The apparatus comprises, essentially, a can provided with a centrally-depressed bottom and with an outlet in the center of said bottom, a cooler within said can and provided with feet by which it is supported on said bottom and over said outlet and whereby it is isolated from said bottom to permit the flow of the milk under the cooler, a milk-aerator supported over said cooler, and a milk-strainer secured to the top of the aerator.

In the accompanying drawings, Figure 1 is a side elevation of our improved apparatus. Fig. 2 is a vertical section of the same, and Fig. 3 is an inverted plan view of the cooler.

In referring to the drawings, A represents a milk-can, which may be of any desired form. Said can is provided with a centrally-depressed bottom $a$, which is elevated. In the center of said bottom is provided an outlet or opening $b$, and extending horizontally from said outlet is a pipe $c$, which terminates under said bottom, to the end of which pipe is attached a faucet $d$, having its handle $e$ protruding through an opening $f$ in the side of the can, whereby it is readily accessible when it is desired to withdraw the contents of the can.

Within the can A is located a cooler B, provided with feet $g$ $g$, by which it is supported upon the bottom $a$ of said can. Said cooler is provided with a removable cover $h$, which is formed with a conical top extending above the can A.

On top of the can is mounted a standard $i$, which standard consists of a ring $i'$, having a plurality of legs $j$ $j$, provided with hook-shaped feet $k$ $k$, which engage the top of the can. Upon said standard and above the cooler B is supported an aerator C, having a concave bottom $l$, provided with a series of perforations $m$ $m$.

To the aerator is secured a strainer D, consisting, preferably, of a cloth placed over the top of the aerator and secured thereon by means of a clamping ring or band $o$.

The improved results obtained by our apparatus are as follows: The milk is poured through the strainer D into the aerator C, whereby the sediment is removed therefrom. The milk then passes through the perforated bottom $l$ of the aerator and is sprayed upon the conical top of the cover $h$ of the cooler B, whereby it is deprived of its animal heat, and thence passes down the outside of the cooler. It is then allowed to stand until the temperature thereof is reduced sufficiently in order to prevent congealing of the same. The milk is then diluted by the introduction of water and is allowed to remain tranquil a sufficient period of time to allow the cream to rise to the top thereof, which action can be readily ascertained by means of a sight-glass $n$, secured in the side of the can A. We prefer to employ two of said glasses arranged near the top and bottom of the can, respectively. When the aforesaid action has taken place, the faucet $d$ is opened and the milk thereby withdrawn through the pipe $c$, whereby the cream is allowed to settle upon the bottom $a$, and subsequently the faucet is opened to withdraw the cream.

One of the most important features of our improved apparatus resides in providing the cooler with supporting-feet to isolate the same from the bottom of the can, and thus forming passages under the cooler to allow the liquid to flow under the same, said feet serving to prevent gyration or eddying of the outflowing liquid, thus causing a draft of said liquid equally from all sides of the can to the outlet and also promoting the discharge of the sediment from the bottom of the can, and, furthermore, by overcoming the aforesaid eddying the mixing of the cream with the diluted milk is prevented, and thus the body of the cream is maintained in a pure and unbroken state.

We are aware of the fact that heretofore in apparatus of this class the milk-can has been provided with means to prevent eddying of the outflowing liquid; but said means are objectionable from the fact that they are very obstructive when it is desired to clean the can. It will therefore be observed that in our apparatus said objection is overcome, as the feet on the bottom of the cooler perform said function, and consequently by removing the cooler the can is free from all obstructions.

What we claim is—

An apparatus for separating cream from milk comprising a milk-can provided with a centrally-depressed bottom and having an outlet in the center of said bottom, a cooler within said can and provided on its bottom with feet supporting the cooler over said outlet with passages under the cooler, said feet serving to prevent eddying of the outflowing liquid and causing a draft of said liquid equally from all sides of the can to the outlet and also promoting the discharge of the sediment from the bottom of the can substantially as described.

In testimony whereof we have hereunto signed our names this 31st day of August, 1897.

CHESTER L. LEE. [L. S.]
FREDERICK G. LEE. [L. S.]

Witnesses:
J. J. LAASS,
M. A. LEYDEN.